M. W. CALDWELL.
BREAD CUTTER.
APPLICATION FILED JUNE 7, 1916.

1,202,158.

Patented Oct. 24, 1916.
2 SHEETS—SHEET 1.

Inventor
Menzo W. Caldwell

By Herbert E. Smith
Attorney

M. W. CALDWELL.
BREAD CUTTER.
APPLICATION FILED JUNE 7, 1916.

1,202,158.

Patented Oct. 24, 1916.
2 SHEETS—SHEET 2.

Inventor
Menzo W. Caldwell

By
Herbert E. Smith
Attorney

UNITED STATES PATENT OFFICE.

MENZO W. CALDWELL, OF SPOKANE, WASHINGTON.

BREAD-CUTTER.

1,202,158.  Specification of Letters Patent.  Patented Oct. 24, 1916.

Application filed June 7, 1916. Serial No. 102,246.

*To all whom it may concern:*

Be it known that I, MENZO W. CALDWELL, a citizen of the United States, residing at Spokane, in the county of Spokane and State of Washington, have invented certain new and useful Improvements in Bread-Cutters, of which the following is a specification.

This invention relates to new and useful improvements in bread cutters and the primary object is to provide a device of this character which will facilitate the slicing of bread whereby slices of uniform thickness may be obtained for ordinary table use.

A further object of the invention resides in providing a device wherein a movable bread board is supported on a base member, the latter being designed for supporting the board and also the hand operated knife.

A still further object resides in providing a retaining member on the bread board adapted for engagement with serrations on the base member, whereby the board may be held in its various positions. And a still further object resides in providing a series of serrated members whereby the adjustments of the board may be made according to the desired thickness of the slices.

With these and numerous other objects in view my invention consists in the novel features of construction, combination and arrangement of parts, as will be hereinafter referred to and more particularly pointed out in the specification and claims.

Figure 1:
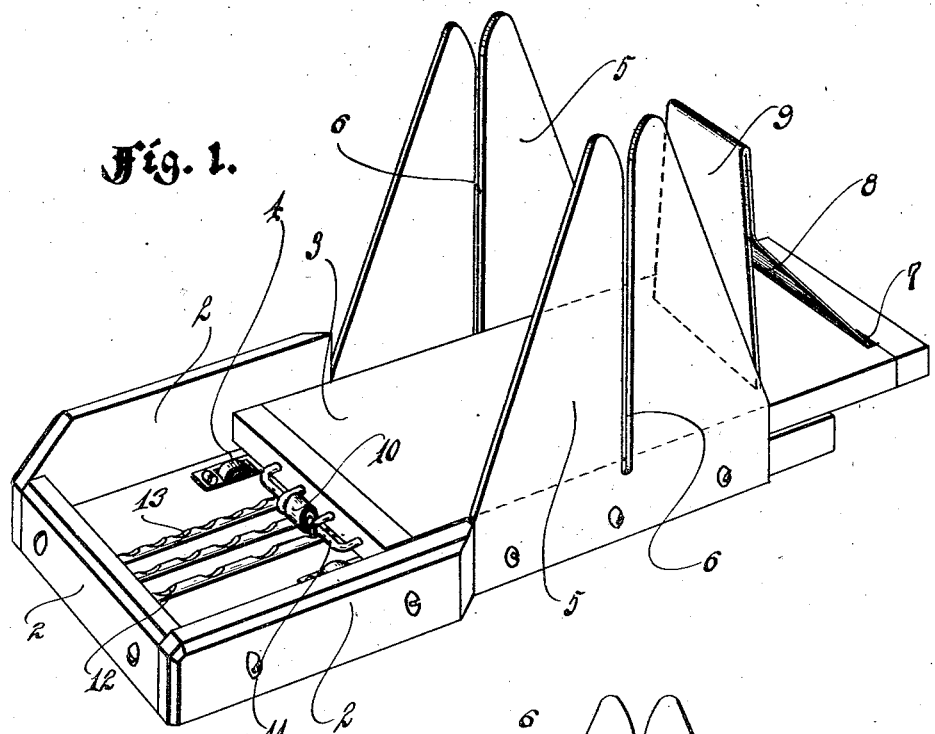
Figure 2:
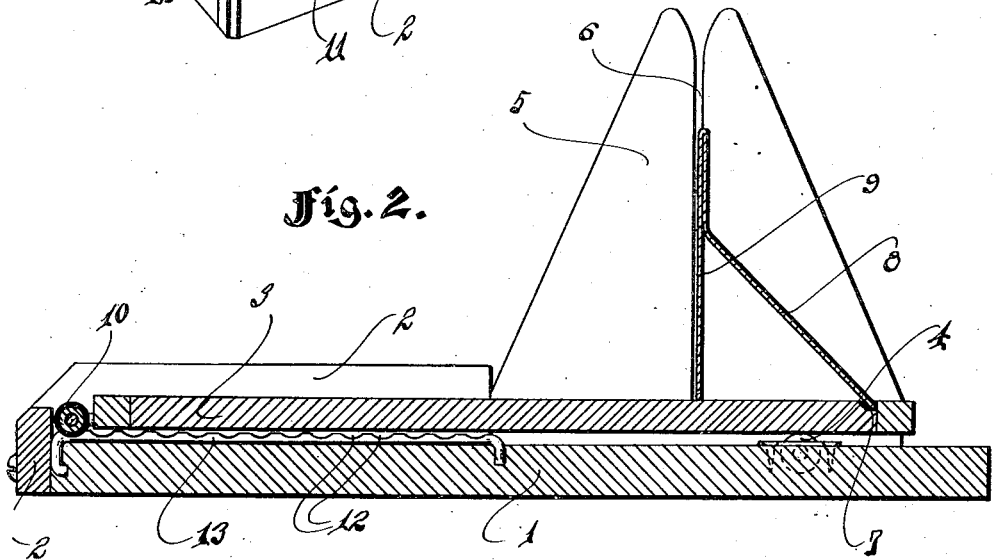
Figure 3:
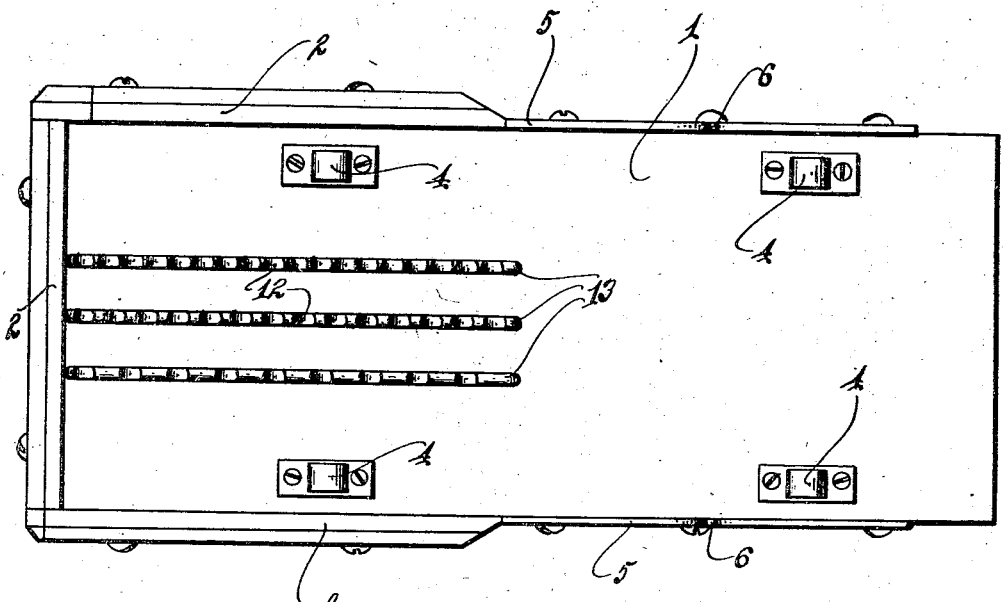
Figure 4:
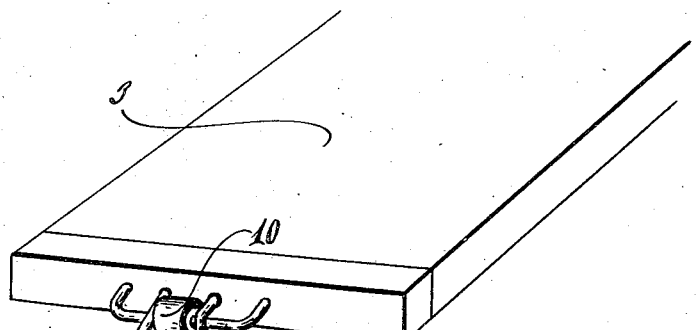

In the accompanying drawings forming a part of this application, Figure 1 is a perspective view of a device constructed in accordance with my invention; Fig. 2 is a longitudinal section therethrough; Fig. 3 is a plan view of the device with the bread board removed; and Fig. 4 is a detail perspective view of the bread board.

In describing my invention, I shall refer to the drawings in which similar reference characters designate corresponding parts throughout the several views and in which—

1 designates a base board to one end and portions of the side edges of which are secured the cleats 2 which form a stop and guide for the movable bread board 3. Suitably supported in predetermined sockets in the base board 1 are the supporting rollers 4 which receive thereon the bread board 3 whereby the latter may roll readily to and fro on the base board. Secured to the side edges of the base board 1 are the substantially triangular metallic guide plates 5, the latter being slit vertically as at 6 to form knife guides.

The bread board 3 is provided adjacent its outer end with a slit or the like 7 which receives therein the free end of the outwardly bent leg 8 of a metallic bread support 9. This bread support is formed of a strip of metal bent upon itself and having its leg portion 8, disposed outwardly, as clearly shown in Fig. 2 of the drawings. By being so constructed the same is obviously resilient, which is a desirable quality.

I have provided an improved means for retaining the bread board in its various adjusted positions and to this end I provide a roller 10 which is movably mounted on a horizontal shaft 11 carried at the inner end of the bread board 3. The roller 10 is adapted to engage notches 12 formed in the series of serrated strips 13 which are provided at the inner end portion of the base board 1. As shown in the drawings there are a trio of said serrated strips, but as many of said strips may be provided as desired, each strip having its notches spaced differently. The roller may be engaged with the notches of any one of the serrated strips, according to the desired thickness of the slices of bread to be cut. The roller 10 is, obviously, movable on the bar or rod 11 to engage the various strips and in carrying out this idea the keys or pegs 14 are provided by which medium the roller may be readily adjusted.

It will be seen from the foregoing that I have provided a simple means for slicing bread wherein the slices may be cut in uniform thicknesses for table use and it will further be seen that as the bread is cut and the bread board is moved along the base board the slices cut will remain standing, the same being supported against the bread support 9. When sufficient bread has been cut this supporting member 9 may be removed and used for handling one end of the cut loaf, the other end being picked up by the blade of the knife. Thus the bread may be cut and removed from the device without coming in contact with the hands.

It will be seen from the foregoing that I have provided a simple, inexpensive and efficient means for carrying out the objects of the invention and while I have particularly described the elements best adapted to perform the functions set forth, it is obvious that various changes in the form, proportion and in the minor details of construction may be resorted to, without departing from the spirit or sacrificing any of the principles of the invention.

Having thus described my invention, what I claim and desire to secure by Letters Patent, is:—

1. In a device of the class described, a base member, knife guides carried thereon, a movable bread support on said base member, serrated members carried by the base member, and means carried by said bread support adapted for selective engagement with said serrated members to hold the support at various positions.

2. In a device of the class described, a base member, knife guides carried thereon, a movable bread support on said base member, a serrated strip secured in said base member at one end thereof and a roller carried by the bread support engaging said serrated member to retain the support in various adjusted positions.

3. In a device of the class described, a base member, knife guides thereon, a movable bread support on said base member, a plurality of serrated members secured on said base member at one end thereof and having serrations of different widths, and an engaging member carried on one end of said bread support and movable laterally for engagement with the various strips, according to the desired adjustments of the bread support.

4. In a device of the class described, a base member, knife guides thereon, a bread support movable longitudinally on the base member, a plurality of serrated strips secured to the base member adjacent one end thereof and having notches of various sizes therein, and a laterally movable roller carried at one end of said bread support and adapted for engagement with the notches of said serrated strips one at a time.

In testimony whereof I affix my signature.

MENZO W. CALDWELL.

Witnesses:
   LEONARD PAUL,
   CARL COOL.